(12) United States Patent
Geyer et al.

(10) Patent No.: US 10,774,765 B2
(45) Date of Patent: Sep. 15, 2020

(54) METHOD FOR STARTING A COMBUSTION ENGINE HAVING A STARTER APPARATUS

(71) Applicant: Andreas Stihl AG & Co. KG, Waiblingen (DE)

(72) Inventors: Klaus Geyer, Sulzbach (DE); Martin Kiesner, Weinstadt (DE); Joerg Praeger, Winnenden (DE); Steffen Bantle, Korb (DE); David Fallscheer, Filderstadt (DE); Erik Ames, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 16/028,231

(22) Filed: Jul. 5, 2018

(65) Prior Publication Data
US 2018/0313284 A1 Nov. 1, 2018

Related U.S. Application Data

(63) Continuation-in-part of application No. 14/462,155, filed on Aug. 18, 2014, now abandoned.

(30) Foreign Application Priority Data

Aug. 16, 2013 (DE) .......................... 10 2013 013 628

(51) Int. Cl.
*F02D 41/06* (2006.01)
*F02D 41/30* (2006.01)
(Continued)

(52) U.S. Cl.
CPC ....... *F02D 41/062* (2013.01); *F02D 41/3005* (2013.01); *F02D 41/34* (2013.01);
(Continued)

(58) Field of Classification Search
CPC .............. F02D 41/062; F02D 41/3005; F02D 2400/06; F02D 41/34; F02D 2200/101;
(Continued)

(56) References Cited

U.S. PATENT DOCUMENTS 5,419,291 A * 5/1995 Kimata ................. F02D 41/062
123/179.16
5,752,488 A * 5/1998 Hattori .................. F02D 41/061
123/179.16
(Continued)

FOREIGN PATENT DOCUMENTS

EP 1 887 204 A1 2/2008
JP S62203943 A 9/1987
(Continued)

*Primary Examiner* — David Hamaoui
(74) *Attorney, Agent, or Firm* — Walter Ottesen, P.A.

(57) ABSTRACT

A method is for starting a combustion engine having a pull-rope starter. A fuel/air mixture is fed to the engine via an intake channel. The mixture is ignited by a spark plug. The combustion drives the piston downward and drives a crankshaft rotationally. The fuel system has a fuel channel opening into the intake channel. An electric fuel valve is open in its currentless state and closes a fuel channel only when an operating voltage is applied. An electronic control unit actuates the fuel valve and triggers an ignition spark and is utilized by a generator to supply energy to the control unit, the fuel valve and the ignition device. To prevent excessive enriching of the fuel/air mixture during starting, the energy, which is generated at the beginning of the rotation of the crankshaft, is used to first close the fuel valve before the control unit triggers an ignition spark.

6 Claims, 3 Drawing Sheets

(51) Int. Cl.
  *F02P 5/04* (2006.01)
  *F02D 41/34* (2006.01)
  *F02N 3/02* (2006.01)
  *F02P 5/15* (2006.01)
  *F02P 1/00* (2006.01)

(52) U.S. Cl.
  CPC ............ *F02P 5/045* (2013.01); *F02D 41/067* (2013.01); *F02D 2200/101* (2013.01); *F02D 2400/06* (2013.01); *F02N 3/02* (2013.01); *F02P 1/00* (2013.01); *F02P 5/1506* (2013.01)

(58) Field of Classification Search
  CPC ......... F02D 41/067; F02N 3/02; F02P 5/045; F02P 1/00; F02P 5/1506
  See application file for complete search history.

(56) References Cited

U.S. PATENT DOCUMENTS

| | | | |
|---|---|---|---|
| 6,932,058 B2* | 8/2005 | Nickel | F02M 1/02 123/179.18 |
| 7,126,449 B2 | 10/2006 | Nickel et al. | |
| 7,140,352 B2* | 11/2006 | Nickel | F02D 41/20 123/438 |
| 7,363,910 B2* | 4/2008 | Schieber | F02P 3/0807 123/406.24 |
| 7,905,217 B2 | 3/2011 | Namari et al. | |
| 7,930,092 B2 | 4/2011 | Tokugawa et al. | |
| 8,161,931 B2 | 4/2012 | Geyer | |
| 2004/0025839 A1 | 2/2004 | Kashibata et al. | |
| 2005/0005914 A1* | 1/2005 | Tamechika | F02D 37/02 123/478 |

FOREIGN PATENT DOCUMENTS

| | | |
|---|---|---|
| JP | H04231641 A | 8/1992 |
| JP | 62586 A | 1/1994 |

* cited by examiner

METHOD FOR STARTING A COMBUSTION ENGINE HAVING A STARTER APPARATUS

CROSS REFERENCE TO RELATED APPLICATIONS

This application is a continuation-in-part application of patent application Ser. No. 14/462,155, filed Aug. 18, 2014, which, in turn, claims priority of German patent application no. 10 2013 013 628.8, filed Aug. 16, 2013, the entire contents of both applications are incorporated herein by reference.

BACKGROUND OF THE INVENTION

Combustion engines in portable, handheld work apparatuses such as motor-driven chain saws, cutoff machines, brushcutters, blower devices or other handheld work apparatuses are predominantly equipped with a pull-rope starter to start the combustion engine manually. The pull-rope starter acts on the crankshaft of the combustion engine and rotates the crankshaft.

A fuel/air mixture (if the combustion engine is a two-stroke engine) also contains the oil which is necessary for operating a two-stroke engine and is fed to the combustion engine via an intake channel. The fuel/air mixture, which is drawn in, is compressed by a piston in a combustion chamber of the combustion engine and is ignited by a spark plug which is actuated by an ignition unit.

The fuel is fed to the intake channel via a fuel system which has a fuel channel which opens into the intake channel and via which the fuel quantity which is fed in flows. An electric fuel valve is arranged in the fuel channel, which fuel valve is open in its nonenergized (currentless) state and releases the fuel channel, and closes the fuel channel only when an operating voltage is applied, with the result that the fuel channel is shut off and no fuel can be drawn by suction into the intake channel.

An electronic control unit controls the fuel valve and the ignition, the electrical energy being made available by a generator which rotates with the crankshaft.

The fuel valve is a normally open valve and no electrical energy for closing the fuel valve is available before the combustion engine is started. For this reason, the fuel channel of the fuel system is first open. If the combustion engine is started, for example via a pull-rope starter, combustion air is drawn in by suction via the intake channel and fuel will also pass via the fuel paths, which are provided, into the intake channel because of the vacuum pressure which is produced as a result. An ignition spark is triggered at the spark plug and the fuel valve is actuated to meter in the desired fuel quantity only after the ignition generator, which is driven with the crankshaft, makes sufficient energy available.

SUMMARY OF THE INVENTION

It is an object of the invention to minimize an uncontrolled fuel flow into the intake channel during starting of a combustion engine.

A method of the invention is for starting a battery-less combustion engine with a pull-rope starter, wherein the combustion engine is part of a combustion engine assembly which includes: an intake channel for conducting a fuel/air mixture to the combustion engine; the combustion engine defining a combustion chamber and having a piston configured to compress the fuel/air mixture in the combustion chamber; a spark plug configured to ignite the compressed fuel/air mixture in the combustion chamber; the combustion engine including a crankshaft operatively connected to the piston so as to permit the piston to impart rotation to the crankshaft; a fuel system including a fuel channel opening into the intake channel and the fuel channel being configured to conduct fuel into the intake channel; an electric fuel valve arranged in the fuel channel; the electric fuel valve being controlled via an operating voltage U; the electric fuel valve having a nonenergized state wherein the operating voltage U is absent and the fuel valve is open so that fuel can flow into the intake channel via the fuel channel; the electric fuel valve being configured to close when the operating voltage U is applied thereto and to block the fuel channel so that no fuel flows into the intake channel; the electric fuel valve being configured to be controlled via the operating voltage U such that an amount of fuel flowing into the intake channel is controlled; an electronic control unit configured to have electric energy supplied thereto so as to control the electric fuel valve via the operating voltage U and to trigger an ignition spark at the spark plug; an ignition generator for generating electric energy for an energy supply for electrical consumers and configured to be driven by the crankshaft. The method includes the steps of: applying the electric energy of the ignition generator, which is generated with the beginning rotation of said crankshaft, initially as the operating voltage U to close the electric fuel valve; and, applying, via the control unit, the electric energy to the spark plug so as to generate an ignition spark only after the fuel valve has been closed.

The prioritization of the energy supply of the electric fuel valve before the ignition achieves a situation where the fuel valve is closed at an early stage, as a result of which an uncontrolled fuel flow into the intake channel is suppressed. The triggering of an ignition spark takes place in time only after the first closure of the fuel valve. This ensures that the fuel which has flowed in an uncontrolled manner, insofar as it is sufficient to form a combustible mixture, is burned, in order to subsequently feed in the fuel quantity which is adapted to operation as intended of the combustion engine via the fuel valve in a controlled manner.

During starting, the energy which is generated by the ignition generator is therefore used first of all to close the fuel valve, and the ignition is activated only after the closure of the fuel valve.

The electrical energy which is necessary to operate the electric consumers such as the control unit, the electric fuel valve and the ignition device is generated exclusively by the ignition generator. It is practical here to first produce the voltage supply of the control unit as the crankshaft begins to rotate, with the result that the control unit is awakened in order to perform its control functions, namely, actuation of the fuel valve and triggering of the ignition.

The ignition generator is configured in such a way that a first (complete) voltage wave is generated before the top dead center TDC of the piston and a second voltage wave is generated before the bottom dead center BDC of the piston. This is achieved by virtue of the fact that two or more permanent magnets, which preferably lie diametrically opposite one another, are arranged over the circumference of the rotor of the ignition generator.

Independently of the operating temperature of the combustion engine, first of all current is applied to the fuel valve, that is, the fuel valve is closed, during each start of the combustion engine as the crankshaft begins to rotate, before an ignition spark is triggered at the spark plug by the control unit. It can be practical here to keep the fuel valve closed over a plurality of crankshaft revolutions, for example over from two to six crankshaft revolutions, in order to flush the combustion chamber with fuel-free combustion air in this way before the fuel quantity, which is necessary for operation of the combustion engine, is measured in in a manner which is metered by the control unit. It has proven advantageous to keep the fuel valve closed over three crankshaft revolutions during a starting operation.

It is practical, in particular, to trigger an ignition spark even when the fuel valve is kept closed, in order that the fuel which has flowed in in an uncontrolled manner, insofar as a combustible mixture has been produced, is burned in the combustion chamber before a controlled fuel quantity which is adapted to the operating conditions of the combustion engine is measured in via the control unit, via the fuel valve.

According to a feature of the invention, it can be advantageous to delay the signal for closing the electric fuel valve depending on a drop in the rotational speed of the crankshaft during the starting operation. This can be advantageous if the combustion engine has run dry, that is, has ceased to operate because of a lack of fuel. In the case of a two-stroke engine, in particular, oil is added to the fuel for lubrication. If the combustion engine runs dry, the lubrication decreases, with the result that there is an increased friction within the combustion engine. In order to determine the state of increased friction, the rotational speed of the crankshaft of the combustion engine is detected and evaluated during the starting operation. If the combustion engine does not start after a starting operation, the rotational speed will drop back to zero again. The gradient of the drop in the rotational speed to zero is dependent on the lubrication; a steep drop in rotational speed is an indicator for reduced lubrication. If a predefined limit value for the gradient of the drop in rotational speed is exceeded, that is, if there is a lack of lubrication, the fuel valve is advantageously kept open for one or more crankshaft revolutions during the starting operation. Sufficient fuel/oil mixture can thus be made available to the combustion engine and lubrication as intended can be ensured within the combustion engine.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
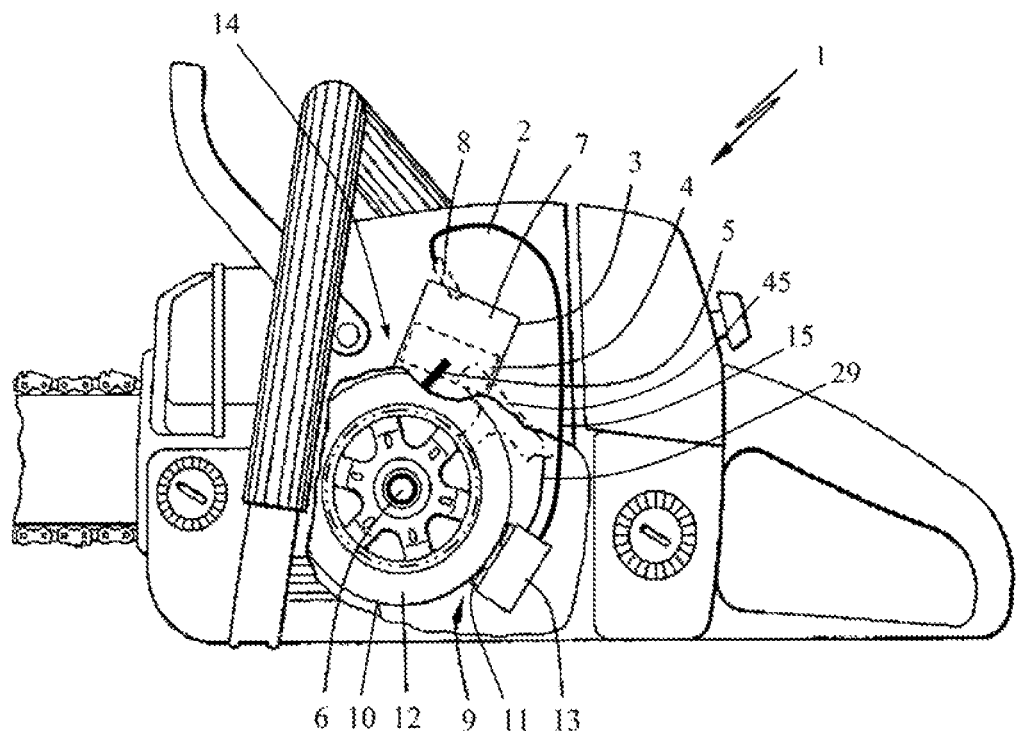
FIG. 1 shows a diagrammatic view of a portable, handheld work apparatus, here by way of example, a motor-driven chain saw.

The work apparatus 1, which is shown in FIG. 1, is configured as a motorized chain saw. The work apparatus 1 could also be a cutoff machine, a blower, a brushcutter or a comparable portable, handheld work apparatus of this type.

A combustion engine 14 is provided in the housing 2 of the work apparatus 1, which combustion engine 14 has a cylinder 3 with a piston 4 which is moved up and down therein and drives a crankshaft 6 via a connecting rod 5. The combustion chamber 7 which is formed in the cylinder 3 and is delimited by the piston 4 is assigned a spark plug 8 which functions to ignite a mixture which is compressed in the combustion chamber 7.

A fan wheel 12 rotates with the crankshaft 6, on the circumference 10 of which fan wheel 12 at least one permanent magnet is arranged. The permanent magnet interacts with a yoke 11 of an ignition generator 9 which comprises an ignition control unit 13. The ignition control unit 13 is connected via an ignition cable 15 to the spark plug 8 and, depending on the rotational position of the crankshaft 6 and therefore the stroke position of the piston 4, triggers an ignition spark for the combustion of a fuel/air mixture which is sucked into the combustion chamber 7.

Figure 2:
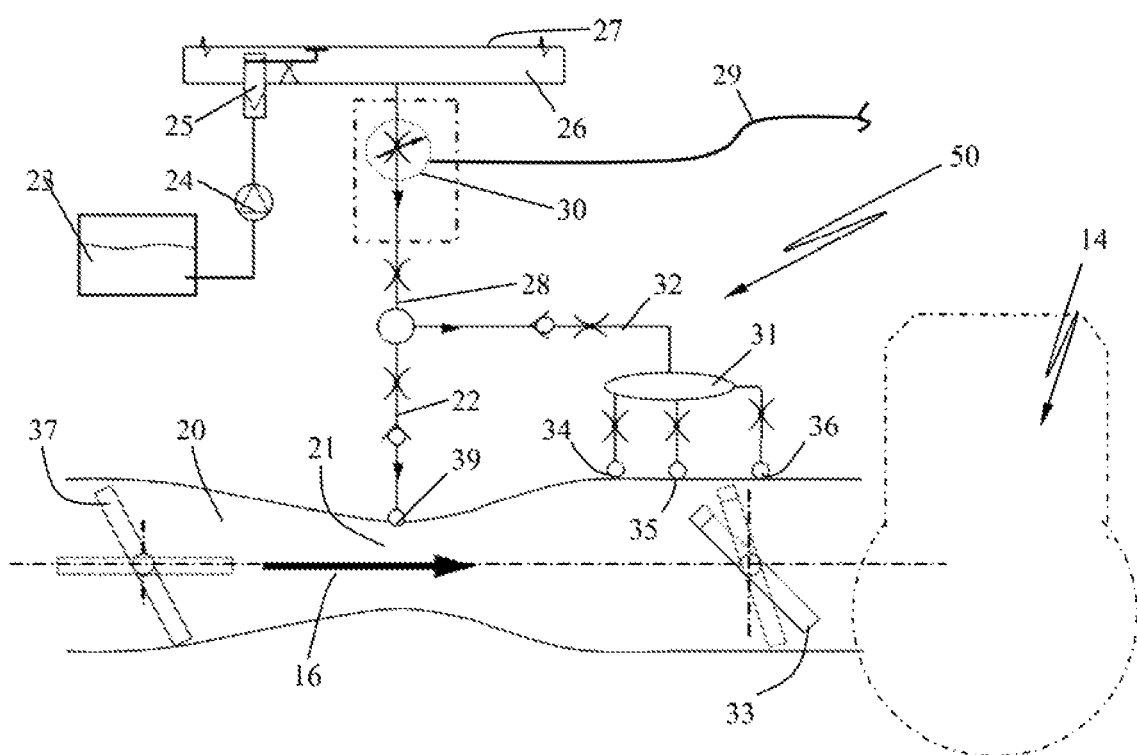
FIG. 2 is a schematic of a fuel system for feeding fuel into the intake channel of a combustion engine.

As shown diagrammatically in FIG. 2, the fuel/air mixture is formed in an intake channel 20, to which end a venturi section 21 is provided, through which the combustion air which flows to the combustion engine 14 (arrow 16) generates a vacuum, in order to suck fuel in via a main nozzle path 22 of the fuel system.

In the fuel system 50 which is shown according to FIG. 2, the fuel is fed from a tank 23 via a fuel prefeed pump 24 and a control valve 25 to a control chamber 26. The control valve 25 is pressure-controlled and always opens when the control membrane 27 is displaced in the direction of the control chamber 26 on account of the outflow of fuel.

The fuel channel 28 from the control chamber 26 to the main nozzle path 22 is controlled by a fuel valve 30 which is to be activated electrically and is actuated electrically by the ignition control unit 13 via a valve cable 29.

Downstream of the fuel valve 30, the fuel channel 28 branches into the main nozzle path 22 and the idle path 32 which feeds via an idle chamber 31 and a plurality of idle nozzles 34, 35 and 36 which open into the intake channel 20 in the pivoting region of the throttle flap 33.

During starting, a choke flap 37 which lies upstream of the venturi section 21 is closed, with the result that the vacuum in the intake channel 20 is increased during the start. The increased vacuum leads (if the fuel valve 30 is open) to an increased fuel flow via the main nozzle 39 of the main nozzle path 22 and the idle nozzles 34, 35 and 36 of the idle path 32 into the intake channel 20. As a result, a mixture which is enriched for starting (rich mixture) is fed to the combustion engine 14.

If the choke flap 37 is open (dotted illustration), merely the throttle flap 33 is pivoted into a starting position during starting, in order to ensure a sufficient fuel feed via the idle nozzles 35 and 36.

Figure 3:
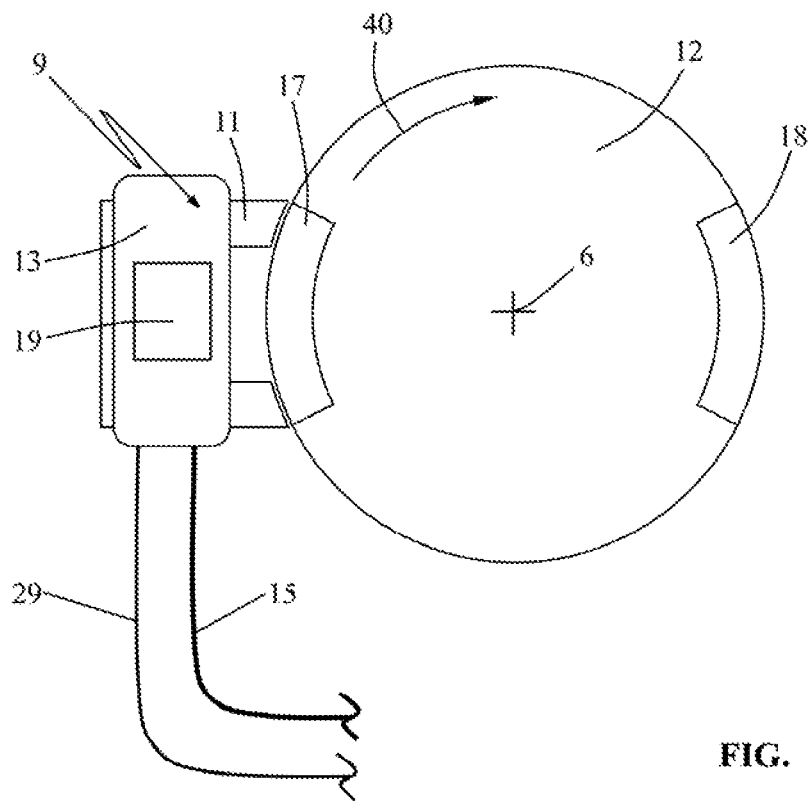
FIG. 3 is a schematic of an ignition generator having two permanent magnets.

The electrical energy supply of the ignition control unit 13, the spark plug 8 and the fuel valve 30 takes place by way of the ignition generator 9 which is shown diagrammatically in FIG. 3 and consists of two permanent magnets 17 and 18 which rotate with the crankshaft 6 and an associated yoke 11. The permanent magnets 17 and 18 are arranged on the circumference of the fan wheel 12 and interact with the yoke 11 which carries coils (not shown in greater detail) on its limbs. The yoke 11, its coils and the electronic circuit for actuating the fuel valve 30 and the spark plug 8 are encapsulated in a common structural unit to form the ignition control unit 13. A microprocessor 19 which is preferably integrated into the ignition control unit 13 controls the ignition firstly and the opening duration of the fuel valve 30 secondly.

The fuel valve 30 is a normally open valve, as described in U.S. Pat. No. 7,126,449 incorporated herein by reference.

When the combustion engine 14 of the work apparatus 1 is started, this usually takes place by way of a pull-rope starter 45.

Combustion air is sucked in via the intake channel 20 in the arrow direction 16 during the first revolutions of the crankshaft, as a result of which a corresponding vacuum is produced which prevails at the main nozzle opening 39 and at the idle openings 34, 35 and 36. If the fuel valve 30 were open, fuel would therefore enter into the intake channel 20.

Figure 4:
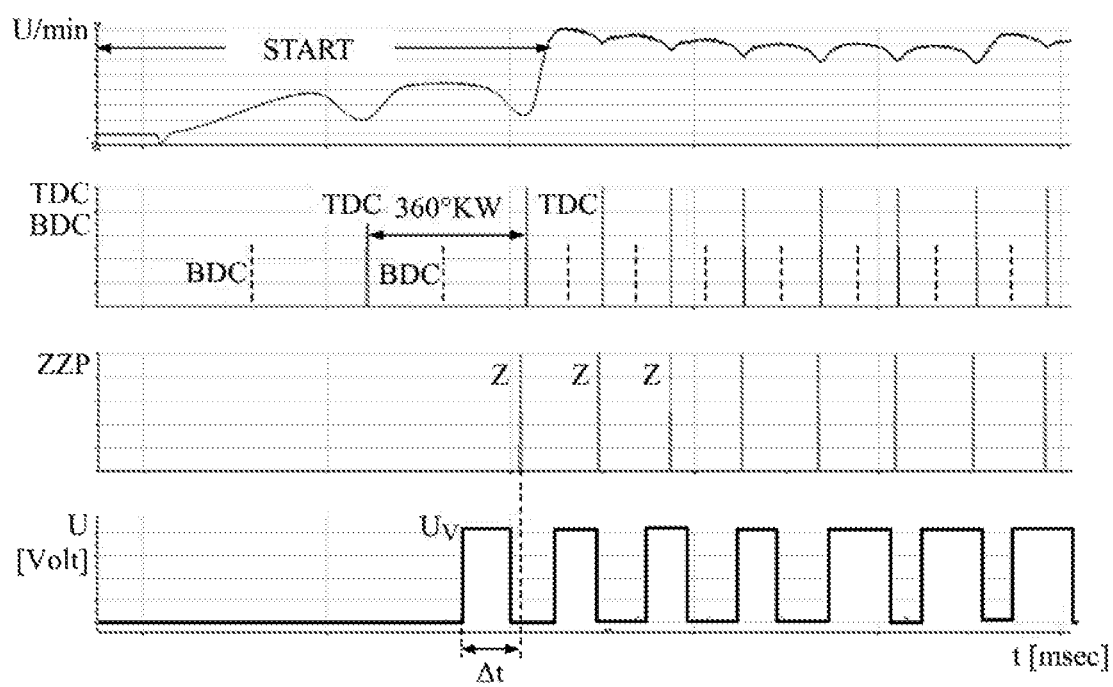
FIG. 4 shows a diagram of the rotational speed, the crankshaft angle, the ignition time and the voltage at a fuel valve plotted as a function of time; and, FIG. 5 is a flow diagram for evaluating the drop in the rotational speed of the crankshaft of a combustion engine during the starting operation.

As shown in the diagram according to FIG. 4, one complete revolution of the crankshaft 6 of 360° of crankshaft angle (CA) will take place, for example via the pull-rope starter, the top dead center TDC of the piston 4 being overcome. The actual rotational speed is shown in the upper illustration in FIG. 4. After the first rotation of the crankshaft over 360° crankshaft angle in the rotational direction 40, sufficient energy is induced in the coils of the yoke 11 via the magnetic field of the permanent magnets 17 and 18, with the result that the fuel valve 30 and the ignition can be actuated. The ignition time IT is shown in FIG. 4 below the piston position (TDC, BDC). It is provided according to the invention that the electrical energy which is generated at the beginning of the rotation of the crankshaft 6 in the rotational direction 40 is first of all transferred to the fuel valve 30, in order that the (normally open) valve is first of all closed. As shown at the bottom in FIG. 4, a voltage U is applied to the fuel valve 30, the voltage $U_V$ lying at the fuel valve 30 by a time factor $\Delta t$ before the first ignition, that is, before the control unit 13 triggers an ignition spark Z (diagram of the ignition time IT) at the spark plug 8.

The entire system is designed in such a way that only the ignition generator 9 generates the energy which is necessary for operation of the electric consumers such as the spark plug 8, the fuel valve 30 and the microprocessor 19.

The sequence is approximately such that, as the crankshaft 6 begins to rotate and a permanent magnet 17 or 18 rotates past the yoke 11 of the ignition generator 9 for the first time, first of all the voltage supply of the control unit 13 is produced and therefore the microprocessor of the control unit 13 is woken up, in order that the microprocessor is operating and can perform its control tasks.

The ignition generator 9 is designed in such a way that a first voltage wave is generated by way of the first permanent magnet 17 before a top dead center TDC of the piston 4 and a second voltage wave is generated by way of the permanent magnet 18 before a bottom dead center BDC of the piston 4. This ensures that sufficient energy is available after one revolution, in order to close the fuel valve 30. Here, independently of the operating temperature of the combustion engine 14, current is applied first of all to the fuel valve 30 during each start of the combustion engine 14 as the crankshaft 6 begins to rotate, before an ignition spark Z is triggered.

It can be provided according to a feature of the invention to keep the fuel valve closed over a plurality of crankshaft revolutions, preferably over from two to six crankshaft revolutions, in order to ensure in this way that excessive enriching of the starting mixture cannot occur, in particular during hot starting. The valve is expediently kept closed completely over three crankshaft revolutions. It can be expedient here to trigger an ignition spark despite the fuel valve being closed, in order to burn any residual mixture which is possibly present in the combustion chamber.

After the fixedly stipulated, prioritized actuation of the fuel valve and one or more crankshaft revolutions, the microprocessor of the control unit is ready for operation and then assumes the control of the opening times of the fuel valve depending on one or more actual operating parameters, such as the temperature, the rotational speed, the opening position of the throttle flap or the like. Correspondingly, the closing duration of the fuel valve is then set or varied, as can be seen from the closing times shown on the right at the bottom of FIG. 4. The control unit 13 has assumed the control of the fuel valve; the fixed prioritization according to the invention of the fuel valve in terms of energy supply during starting is canceled.

Figure 5:
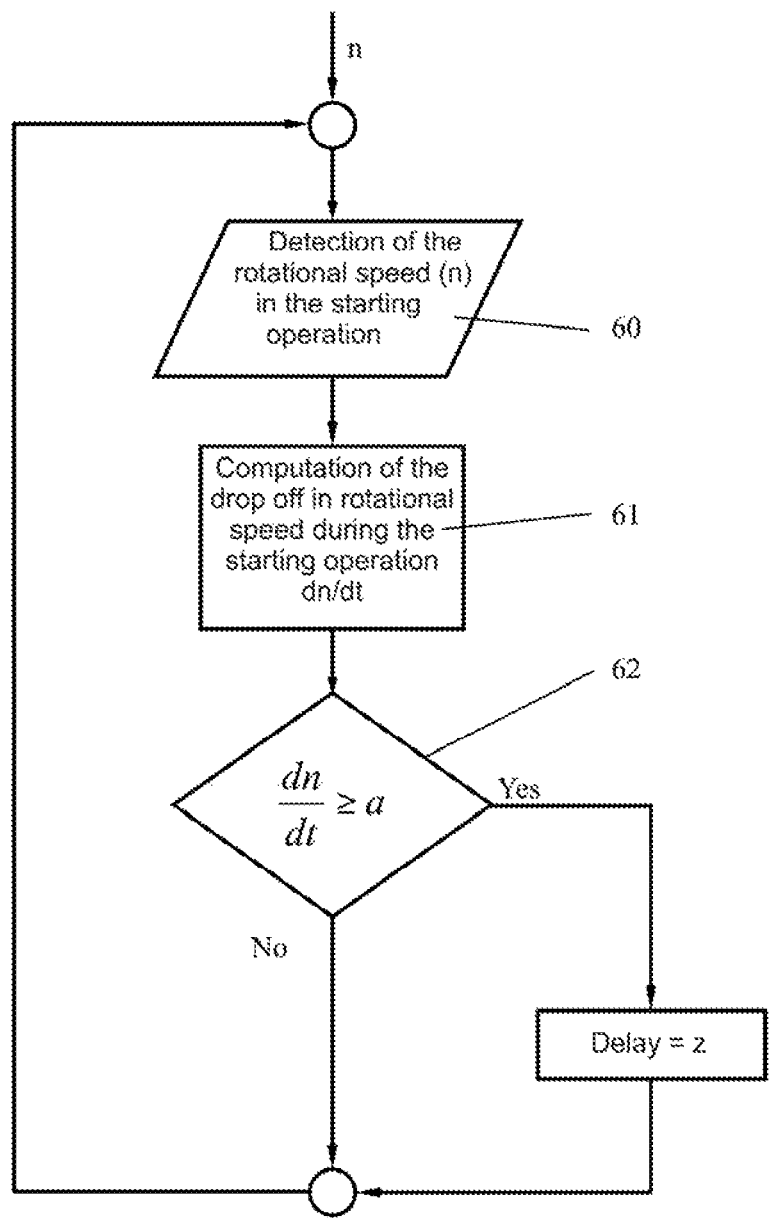

It can be provided according to a feature of the invention to delay the closure of the electric fuel valve 30 depending on a drop in rotational speed dn/dt of the crankshaft 6 of the combustion engine 14 during the starting operation. To this end (see the flow diagram of FIG. 5), the rotational speed (n) of the crankshaft 6 is detected by the control unit 13 in accordance with block 60. If the combustion engine 14 comes to a standstill, for example because of a lack of fuel, the mixture paths and the combustion chamber are free of fuel. Oil is added to the fuel for lubrication, in particular, in the case of a two-stroke engine or a mixture-lubricated four-stroke engine. If the combustion engine 14 runs dry, the lubrication decreases, with the result that there is an increased friction within the combustion engine 14. To determine this state of increased friction in the combustion engine 14, the rotational speed (n) of the crankshaft 6 of the combustion engine 14 is first detected (block 60) in the starting operation in accordance with the flow diagram in FIG. 5. If the combustion engine 14 does not start after a starting operation, the rotational speed (n) will drop back to zero again. This drop in rotational speed dn/dt after an unsuccessful starting attempt is evaluated according to block 61 and is dependent on the actual lubrication; a steep drop in rotational speed dn/dt, that is, a great gradient, is an indicator for reduced lubrication. If a predefined limit value a for the drop in rotational speed dn/dt is exceeded, there is a state of increased friction. Block 62 branches off via the branch "YES" to a delay (z), that is, the fuel valve is advantageously held open for one or more crankshaft revolutions during the starting operation. Sufficient fuel/oil mixture can thus be made available to the combustion engine and sufficient lubrication within the combustion engine can be ensured.

If the predefined limit value (a) for the drop in rotational speed dn/dt is not undershot, there is no state of increased friction. Block 62 branches via the branch "NO" back to block 60. A renewed examination of the drop in rotational speed during the starting operation is initiated.

The detection of a state of increased friction is also advantageous if the fuel delivery is restricted on account of air or vapor bubbles in the fuel system. Restricted or interrupted fuel delivery can also lead to a state of increased friction occurring in the combustion engine. It can be advantageous to also delay the signal for closing the electric fuel valve in this state, in order to assist the fuel delivery. The principle for detecting the reduced lubrication is effected in accordance with the flow diagram in FIG. 5.

It is understood that the foregoing description is that of the preferred embodiments of the invention and that various changes and modifications may be made thereto without departing from the spirit and scope of the invention as defined in the appended claims.

What is claimed is:

1. A method for starting a battery-less combustion engine with a pull-rope starter, wherein the combustion engine is part of a combustion engine assembly which includes:

an intake channel for conducting a fuel/air mixture to the combustion engine;

the combustion engine defining a combustion chamber and having a piston configured to compress the fuel/air mixture in the combustion chamber;

a spark plug configured to ignite the compressed fuel/air mixture in the combustion chamber;

the combustion engine including a crankshaft operatively connected to the piston so as to permit the piston to impart rotation to the crankshaft;

a fuel system including a fuel channel opening into the intake channel and the fuel channel being configured to conduct fuel into the intake channel;

an electric fuel valve arranged in said fuel channel;

the electric fuel valve being controlled via an operating voltage U;

the electric fuel valve having a nonenergized state wherein the operating voltage U is absent and the fuel valve is open so that fuel can flow into the intake channel via the fuel channel;

the electric fuel valve being configured to close when the operating voltage U is applied thereto and to block the fuel channel so that no fuel flows into the intake channel;

the electric fuel valve being configured to be controlled via the operating voltage U such that an amount of fuel flowing into the intake channel is controlled;

an electronic control unit configured to have electric energy supplied thereto so as to control the electric fuel valve via the operating voltage U and to trigger an ignition spark at the spark plug;

an ignition generator for generating electric energy for an energy supply for electrical consumers and configured to be driven by the crankshaft;

the method comprising the steps of:

applying the electric energy of the ignition generator, which is generated with the beginning rotation of said crankshaft, initially as the operating voltage U to close the electric fuel valve;

applying, via the control unit, the electric energy to the spark plug so as to generate an ignition spark only after the fuel valve has been closed; and, wherein, independently of the operating temperature of the combustion engine and for each start of the combustion engine, current is first applied to the electric fuel valve with said beginning rotation of the crankshaft before an ignition spark is triggered.

2. The method of claim 1, wherein the electric fuel valve is held closed over two to six crankshaft revolutions.

3. The method of claim 1, wherein an ignition spark is triggered over multiple crankshaft rotations with the fuel valve closed.

4. The method of claim 1, wherein the ignition generator is configured to generate a first voltage half-wave in advance of top dead center (TDC) of the piston and a second voltage half-wave in advance of bottom dead center (BDC) of the piston.

5. The method of claim 1 further comprising the step of establishing a voltage supply of the control unit with said beginning rotation of the crankshaft, wherein the control unit is awakened.

6. A method for starting a battery-less combustion engine with a pull-rope starter, wherein the combustion engine is part of a combustion engine assembly which includes:

an intake channel for conducting a fuel/air mixture to the combustion engine;

the combustion engine defining a combustion chamber and having a piston configured to compress the fuel/air mixture in the combustion chamber;

a spark plug configured to ignite the compressed fuel/air mixture in the combustion chamber;

the combustion engine including a crankshaft operatively connected to the piston so as to permit the piston to impart rotation to the crankshaft;

a fuel system including a fuel channel opening into the intake channel and the fuel channel being configured to conduct fuel into the intake channel;

an electric fuel valve open when deenergized being arranged in said fuel channel;

the electric fuel valve being controlled via an operating voltage U;

the electric fuel valve having a nonenergized state wherein the operating voltage U is absent and the fuel valve is open so that fuel can flow into the intake channel via the fuel channel;

the electric fuel valve being configured to close when the operating voltage U is applied thereto and to block the fuel channel so that no fuel flows into the intake channel;

the electric fuel valve being configured to be controlled via the operating voltage U such that an amount of fuel flowing into the intake channel is controlled;

an electronic control unit configured to have electric energy supplied thereto so as to control the electric fuel valve via the operating voltage U and to trigger an ignition spark at the spark plug;

an ignition generator for generating electric energy for an energy supply for electrical consumers and configured to be driven by the crankshaft;

the method comprising the steps of:

when starting the combustion engine with the rope starter, suppressing an uncontrolled fuel flow into the intake channel by applying the energy generated by the ignition generator to effect a first closure of the electric fuel valve; and, only after having effected the first closure of the electric fuel valve, triggering an ignition spark by the spark plug in the combustion chamber via the control unit so as to cause fuel, which had flowed into the intake channel in an uncontrolled manner, to be combusted so as to permit subsequently feeding fuel via the electric fuel valve in a quantity adapted to operation of the combustion engine.

* * * * *